July 3, 1956            L. H. CARR            2,752,669
METHODS FOR MANUFACTURING HIGH PRESSURE VESSELS
Filed Sept. 29, 1953
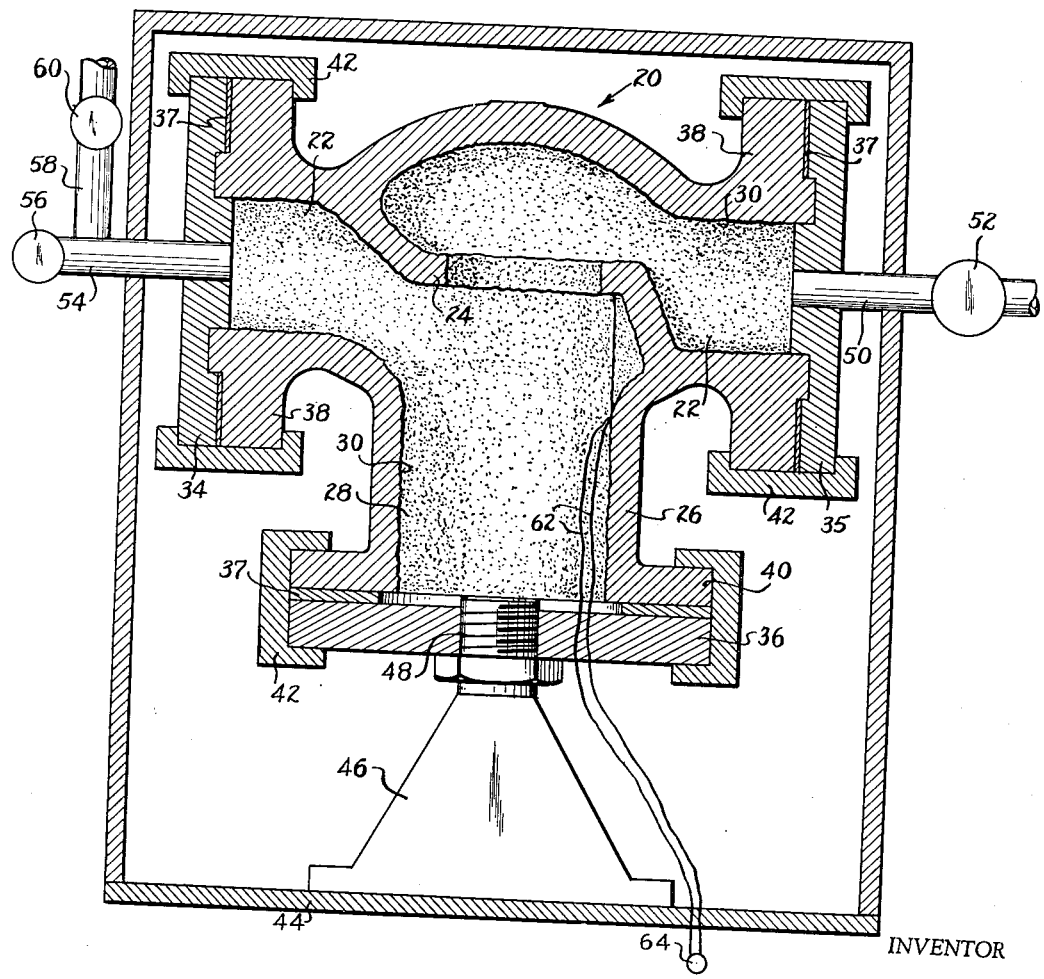
INVENTOR
LAURENCE H. CARR
BY Strauch, Nolan & Diggins
ATTORNEYS

2,752,669

METHODS FOR MANUFACTURING HIGH PRESSURE VESSELS

Laurence H. Carr, Homewood, Ill., assignor to Edward Valves, Inc., East Chicago, Ind., a corporation of Indiana Application September 29, 1953, Serial No. 382,978

7 Claims. (Cl. 29—404)

This invention relates to novel methods of manufacture of irregularly shaped pressure vessels, and is particularly directed to novel methods of manufacturing vessels such as valve bodies adapted for operation under high internal pressures and temperatures, to give such valve bodies superior qualities of strength and dimensional stability.

While the methods of the present invention are of general application and may be used in the fabrication of a wide variety of pressure vessels, the invention will be described in connection with the fabrication of valve bodies, which because of their irregular shape and high service requirements cause unusually difficult manufacturing problems.

Pressure vessels such as valve bodies, turbine housings, and the like adapted for operation under high internal pressures of necessity are constructed of relatively thick wall sections to effectively withstand the operating forces involved.

If has been found in practice that the stress distribution in such pressure containing vessels is not uniform and as a result certain portions of the vessels carry a disproportionate share of the pressure loads. In practice this has been found to be particularly true in the case of valve bodies where desired flow characteristics require irregular body shapes. As a result of this uneven loading or stress concentration it was found that permanent and irregular structural changes are produced in certain portions of such valve bodies under the influence of high operating pressures within the valve bodies to the extent that the valve seats are so distorted that they fail to provide a pressure tight seal.

Previous efforts in the art to provide pressure vessels of high strength and dimensional stability have met with little success even when applied to vessels of relatively simple and uniform structural configuration or to irregularly shaped vessels adapted for operation in the relatively low pressure and temperature ranges. United States Letters Patent 2,117,351 issued to Sven J. Nordstrom is an example of a prior attempt to treat valve bodies to distribute the stresses more uniformly and thereby prevent subsequent deformation of the valve bodies during service operation. While the Nordstrom method which utilizes the principles of autofrettage, provides increased dimensional stability in valve bodies in some cases, it has failed to provide the stability and high strength required in valve bodies which are required to function under both high pressures and high temperatures, with which the present invention is primarily concerned.

The process of autofrettage utilized in the Nordstrom patent has been widely applied to the manufacture of gun barrels and consists essentially of elastically yielding the inner surfaces of the smooth cylindrical gun barrels by means of high internal pressures applied at room temperature. The applied internal pressure is high enough to exceed the yield point of the inner fibers of the pressure vessel material. As this material yields, some of the tensile stresses are transferred to the outer less highly stressed fibers. When this high internal pressure is released, the inner fibers will be left in compression due to the fact that they have been elastically elongated and the elastic return of the outer fibers tends to compress these elongated fibers. The new stress distribution through the wall shows a compression stress at the inner surface which falls toward zero on a neutral axis within the wall section and a gradually increasing tensile stress from the neutral axis outwardly to a maximum tensile stress at the outermost fibers. This will mean that in subsequent service, such a cylinder may be stressed to a point higher than would normally be the case without causing any further plastic flow of the inner fibers since the induced operating stress will be first nullified up to the value of the compressive stress on the inner fibers.

The autofrettage method of prestressing, however, has two serious deficiencies when applied to valve bodies used in high pressure, high temperature operation. First, is the very high pressure which would be involved to properly distribute the stresses in a valve body to be used in such high pressure, high temperature applications. A valve carrying a nominal rating of 2500 pounds would have to be stressed at a pressure on the order of 30,000 p. s. i. to achieve any beneficial results from this method. Obviously the equipment necessary to produce such pressures is too costly and the method is too difficult to permit its use on a production basis. Secondly, it has been found that metal that is cold worked by the autofrettage method is unsatisfactory for high temperature service, since such metal shows an increased tendency to flow or creep when placed in high temperature operation. Such creep of the valve body in service may destroy the sealing efficiency of the valve seat, and for this reason the autofrettage method has been found unsatisfactory in its application to high temperature, high pressure valve bodies.

It has been found in practice that the phenomenon of creep of metals at high temperatures serves to relieve high stresses in pressure vessels in much the same manner that autofrettage operates at room temperatures. However, the major objections to depending upon service creep as a method of leveling out stresses when considering valve applications is that structural distortion accompanies the redistribution of stresses effected by service creep and obviously such structural distortions are objectionable in valve bodies or other structures that are required to seal under high operating pressures or otherwise require dimensional stability. It has been found in practice that a distortion of .003 inches which may be caused by service creep seriously decreases the sealing efficiency of a valve in high pressure, high temperature operation, and that it is difficult if not impossible to close a valve with such a distortion in it.

Additionally test data also indicates that the low rate of creep experienced in the course of service operation increases the susceptibility of the metal to fracture and is therefore an unreliable and unsafe means for levelling out the stress concentration in a valve body adapted for high pressure usage.

According to the present invention deleterious effects resulting from the tendency of a valve body to deform structurally while in service operation under high temperatures and high pressures is obviated by prestressing the valves in a novel manner before the final machining operation to effect such a redistribution of the stresses in the valve body that there will be no detrimental structural deformations or redistribution of stresses thereafter in service operation.

It is therefore a primary object of the present invention to provide methods of treating high pressure vessels to increase the strength of the vessels and to assure dimensional stability over an extended service life.

It is a further object of this invention to provide novel methods of prestressing high pressure vessels by heating the vessel to elevated temperatures to increase the ductility of the vessel under a prestressing pressure.

It is also an object of this invention to provide novel methods for prestressing pressure vessels employing correlated high pressures and high temperatures to assure stress distribution in accordance with predetermined optimum patterns.

Another object of this invention is to provide novel methods for prestressing pressure vessels wherein the residual stresses in the vessel after prestressing are relatively low to give greater dimensional stability to the pressure vessel in high temperature operation.

An additional object of this invention is to provide novel methods for prestressing pressure vessels in which the elastic strains imposed upon the vessel during prestressing are relatively low to prevent any elastic return of portions of the vessel to undesirable configuration after prestressing.

These and other objects will become apparent from the following description and appended claims when read in connection with the attached drawings, wherein the single figure is a vertical sectional view of a high pressure valve body to which the invention has particular application, showing the valve in the unfinished machine state mounted in apparatus for carrying out the novel method of this invention.

The analysis of the stress problem present in pressure vessels, prior attempted solutions, and the solution by the novel method of this invention will be described with reference to valve bodies and particularly those used in high pressure-high temperature applications, but it is to be understood that the novel method herein disclosed is equally applicable to prestressing any type of pressure vessel regardless of the conditions under which it is to operate.

The localization or concentration of stresses in valve bodies, and other pressure vessels, arise from a number of causes. A primary cause of such concentration is inherent in the elastic stress pattern in a simple circular cylinder. This stress distribution is classically developed by Lame's formula as described in Seely's text Resistance of Materials, 1935 edition, at page 358 to which reference is made for a detailed discussion of the formula. This formula demonstrates that the highest stress in such a cylinder is a tangential stress.

Assuming a cylinder having an inner radius of 2.5 inches, an outer radius of 5 inches, and an internal pressure of 6,000 p. s. i. Lame's formula shows that the stress on the inner and outer fibers of 10,000 p. s. i. and 4,000 p. s. i., respectively, showing a considerable concentration of stress on the inner fibers of the vessel. The mere increasing of the wall thickness of the vessel is not effective in reducing the stress concentration, since doubling the wall thickness would only decrease the stress on the inner fiber to 7,500 p. s. i. and infinitely thick wall sections would reduce the stress on the inner fibers to only 6,000 p. s. i.

The foregoing formula is applicable to simple circular cylinders and since most valve bodies are of irregular configuration to be adapted to give desired operating functions, variations in shape increase the localization or concentration of stresses. By virtue of the irregular configuration stresses existent in the simple circular cylinder are augmented by additional bending stresses developed by the forces acting within the non-circular chamber. The method of calculating the tangential stresses in such irregularly shaped vessels has been developed by Timoshenko and Lessells in their text Applied Elasticity, 1925 edition, at page 244, to which reference is made for a detailed discussion.

Again assuming a pressure of 6,000 p. s. i. applied internally to a chamber of elliptical section where the long inside radius is 2.5 inches, the long outside radius is 5 inches, and the short inside radius is 2 inches the maximum stress is found to be 12,500 p. s. i. at the inner surface and approximately 2,500 p. s. i. at the outer surface. Further exaggerations of the elliptical form of the vessel greatly aggravate the stress concentration on the inner fibers of the vessel.

Other factors which produce an increased localized stress concentration in pressure vessels are surface defects caused by forging flaws, machining, and other reasons; and repair welds which may be necessary to correct an unsound condition in a valve forging or casting. In the case of repair welds it is found that such welds result in localized stress conditions on the order of 40,000 to 50,000 p. s. i., and the normal practice of reheating such welds in a temperature range of 1100° F. to 1300° F. for relieving the stress concentration usually reduces the stresses induced by such welding to a level of approximately 5,000 p. s. i. However, it should be noted that these residual tensile stress levels, although they may be low, will supplement the mechanically induced stress concentration caused by the fluid pressures within the valve which may distort the valve body and particularly the seat area beyond permissible limits.

Much of the stress concentration generated in high pressure valve bodies is a result of the particular shape of the valve body necessary to minimize resistance to fluid flow. If ideal flow shapes were discarded, shapes of lower stress concentration might be developed. However, this obviously would reduce the efficiency of such a valve and would necessitate a larger valve to meet the same service requirement. The larger valve apparently has higher stresses and hence, the ultimate purpose in initially changing the shape of the valve or vessel would be defeated.

Every effort is made to remove surface defects, which contribute to stress concentration, in the course of manufacture of high pressure valves, but such efforts have met with only limited success, since even with the best means known to eliminate such defects certain small discontinuities will always be present in metallic structures to cause undesirable stress concentrations. And even complete removal of surface defects would not obviate the problem which is caused by a number of factors heretofore described, which contribute to the stress problem.

The use of higher strength steels would appear to be an obvious solution to the problem of offsetting high stress concentrations. However, there are several disadvantages in this apparent solution. First, it is well known that steels of higher tensile and yield strength generally have lower ductility, hence, can withstand less plastic deformation without fracture. As a result they are hazardous to use in structures such as high pressure valves, which operate under high pressures and contain high stress concentrations. Secondly, steels known to have high strength at room temperatures are not necessarily those which have high strength at elevated temperatures.

The foregoing analysis serves to clearly demonstrate the problems present in stress relieving irregularly shaped pressure vessels, such as valve bodies; the materials problems involved; and the methods heretofore known, which have been demonstrated to be unsatisfactory, for stress relieving valve bodies intended for high temperature, high pressure service.

In overcoming this long standing problem in the industry the present invention provides novel methods for stress relieving valve bodies, and other pressure vessels, by the application of relatively high correlated temperatures and pressures for controlled periods of time for stress relieving valve bodies to maintain or increase their strength and to provide dimensional stability throughout an extended service life.

Essentially the methods of the present invention, as applied to valve bodies, comprise heating the rough-machined valve body throughout to a temperature sufficient to materially increase its ductility, for example, 1000° F. to 1200° F. or 200 or 300 degrees above the expected operating temperature, applying an internal pressure preferably slightly exceeding the expected service pressure, permitting the valve to cool until the creep is stabilized and then relieving the applied pressure. These pressures and temperatures are such that sufficient plastic flow to establish a desired stress pattern may be achieved within a relatively short time, for example, one to ten hours. After cooling, the valve body is machine finished to the desired dimensions.

Referring now more particularly to the drawing there is shown a typical valve body generally designated 20 in conjunction with which the present novel prestressing method of this invention will be described. The valve body 20 is provided with a pair of axially aligned bores 22 serving as inlet and outlets. An integral valve seat 24 cooperates with a closure member (not shown) to selectively connect and disconnect the inlet and outlets. Extension or bonnet mount 26 of the body is provided with a bore 28 transverse to bores 22 for receiving a valve operating stem and bonnet assembly (not shown). As clearly seen in the drawing and indicated by exaggerated irregular lines 30 the valve is left in a rough machine state to permit prestressing by means of the novel method of this invention after which the valve body is machined to finished dimensions.

Valve body 20 in semi-finished state indicated in the drawing is mounted in suitable apparatus to carry out the novel prestressing method of the invention, one form of which will now be particularly described.

Valve body bores 22 and 28 are suitably sealingly plugged by cover plates 34, 35 and 36 securely held in fluid tight relation on gaskets or seals 37 against flanges 38 and 40, respectively, by suitable split ring clamps 42. The plugged valve is mounted in a suitably controlled high temperature furnace 44 by means of support 46 which has a threaded end 48 engaging a suitable threaded opening in cover plate 36. A conduit 50 having a manual or automatic control valve 52 extends into furnace 44 for admitting a fluid to the interior of the body for a purpose to be described, and is connected to the interior of the valve body through cover plate 35.

A suitable gauge line 54 is connected to the other cover plate 34 and extends exteriorly of the furnace 44 to a suitable pressure indicating gauge 56. A line 58 is operatively connected to gauge line 54 exteriorly of furnace 44 and is provided with manual or automatically controlled valve 60 for a purpose to be described. A suitable temperature measuring device such as a thermocouple 62 is connected to the wall of the valve body 20, as clearly seen in the drawing, and is connected to a suitable instrument 64 to indicate the temperature of the valve body.

Once valve body 20 has been mounted in furnace 44 and connected to the associated fluid lines and temperature indicating devices the furnace is brought up to a heat sufficient to heat the valve body to a temperature for example of 1200° F. The prestressing temperature is preferably 200 to 300 degrees over the expected operating temperature and thus will depend upon the service conditions to which the valve will be subjected.

Upon reaching the above temperature range, valve 52 is opened to admit a controlled amount of water to the interior of valve 20 through fluid line 50. The water so admitted to the interior of valve body 20 immediately turns to steam exerting a high internal pressure within the valve body. The prestresssing pressure exerted by the expanding steam preferably exceeds slightly the operating pressure of the valve. Control of the prestressing pressure is maintained by means of relief valve 60 connected to pressure gauge line 54. Control of the applied pressure which is a fraction of that employed in autofrettage is relatively simple and accordingly the method may be employed on a production basis at low cost.

The relatively high temperature to which valve body 20 is heated materially increases the ductility of the valve body metal and in conjunction with the high internally applied prestressing pressure, which is preferably equal to or slightly in excess of the operating pressure of the valve, effects a relatively rapid creep of the metal to effect a redistribution of the stresses in the valve body in a relatively short period of time, on the order of one to ten hours.

Once the valve body has been prestressed by the foregoing novel method it is allowed to cool before the prestressing pressure is relieved through valve 60. The temperature of the valve body is preferably allowed to fall 200 or 300 degrees to prevent reverse plastic flow which would occur if the pressure were relieved when the body is still at the full prestressing temperature. Such reverse flow would destroy the desired stress pattern effected during the previous heating and pressurizing.

In practice, using superheated steam as the pressurizing medium, it is advisable to keep the steam pressure at least down to the saturation pressure in the order of 600° to 700°. When the vessel has reached this temperature the creep is stabilized and the pressure may be relieved.

The outer fibers which have been put in tension induce a residual compressive stress on the inner fibers of a magnitude of approximately the operating pressure of the valve or slightly higher. As a result, in service operation the tensile stresses exerted by the operating pressure of the valve will be substantially nullified by the residual compressive stresses induced in the valve body by the novel prestressing method heretofore described.

Heating the structure to be prestressed to elevated temperatures before any stressing pressures are applied puts the structure in a condition of maximum ductility, so that the amount and rate of creep or plastic deformation is relatively rapid. Of added importance is the fact that the novel prestressing method herein disclosed results in a valve body structure of superior strength over any structures heretofore known in the art. This is the result of effecting plastic deformation in a relatively short period of time while the metal to be prestressed is at its maximum ductility. If the prestressing pressure or temperature is low to permit a relatively slow rate of creep or plastic deformation there would be a greater danger of fracture in the resulting structure.

Once the foregoing prestressing operation has been carried out and the valve body has completely cooled it is machine finished to its final dimension which will remain unchanged through extended service operation because of the novel prestressing operation of this invention.

The foregoing method is particularly beneficial when dealing with cast alloy valve materials which are known to have only limited ductility at low temperatures. Further, as heretofore noted, cold working a valve as in autofrettage does not assure stable operating conditions since steel which has been cold worked at room temperature has increased susceptibility to creep at elevated temperature, and subsequent high temperature operation will appreciably distort the valve body and valve seat area.

Whereas autofrettage yields the fibers by cold working, making them susceptible to future creep, the methods of the present invention yield them by the initial stages of the creep phenomena, which makes them highly resistant to future creep.

Also the novel methods of the present invention may provide lower residual stresses than possible with autofrettage since the volume of metal stressed is substantially greater than in the case of autofrettage. This also provides better dimensional stability during subsequent high temperature operation.

Additionally, it has been found, with the novel method herein disclosed that elastic strain induced in the material before plastic flow takes place will be much lower than that created by the autofrettage method. In complicated valve shapes this is of major importance since the elastic recovery after high pressure cold working, as in autofrettage, might be sufficient to impart undesirable structural characteristics to the valve body.

It will be seen, therefore, that presently disclosed methods of relieving the stress concentration in irregularly shaped pressure vessels such as valve bodies produces a valve body of stable dimensions during its normal service life and having greater strength than the valve bodies treated by methods heretofore known in the art.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In the manufacture of valves the method of effecting a stress distribution in the valve body to give a dimensionally stable structure under normal operating conditions which comprises, forming a valve body to semi-finished dimensions; heating the valve body to increase the ductility of the valve body material; subjecting the heated valve body to a high uniform internal pressure to effect a slight permanent deformation of portions of said valve body to redistribute the stresses in said valve body for more efficient and stable valve operation; cooling said body; relieving the internal pressure after said body is at least partially cooled; and thereafter machining the valve body to its finished dimensions.

2. In the manufacture of dimensionally stable vessels for containing high pressure and high temperature operating fluids the method of manufacture which comprises, pre-heating a semi-finished vessel to a temperature at least equal to the operating temperature of the fluid to be used therein; subjecting said vessel to a high uniform internal pressure for a sufficient length of time to effect redistribution of the stresses in said vessel and slight permanent deformation of portions of said vessel; cooling said vessel; relieving the internal pressure after said vessel is at least partially cooled; and thereafter machining said vessel to its final dimensions.

3. In the manufacture of irregularly shaped vessels for containing high pressure and high temperature operating fluids the method which comprises heating a rough formed vessel to a temperature in excess of the operating temperature of the fluid to be used therein; subjecting said vessel, after it has been sufficiently heated, to a uniform internal pressure at least equal to the pressure of the operating fluid to be used therein for a sufficient length of time to effect redistribution of the stresses in said vessel and slight permanent deformation of portions of said vessel; cooling said vessel; relieving the internal pressure after said vessel is at least partially cooled; and thereafter machining said vessel to its final dimensions.

4. In the manufacture of valves the method which comprises, forming a valve body to semi-finished dimensions; pre-heating the semi-finished valve body to a temperature in excess of the operating temperature of the fluid to be used therein to increase the ductility of the material of which the valve body is composed; subjecting said valve body, after it has been sufficiently pre-heated, to a high uniform internal pressure to effect a relatively rapid plastic flow and slight permanent deformation of portions of said valve body to effect a desired stress distribution in said valve body; cooling said valve body while maintaining said internal pressure to prevent reverse plastic flow; relieving said pressure; and thereafter machining said valve body to its finished dimensions.

5. In the manufacture of valves the method which comprises forming a valve body to semi-finished dimensions; pre-heating the valve body to a temperature of 200° F. to 300° F. in excess of the operating temperature of the fluid to be used therein to increase the ductility of the material of which the valve body is composed; subjecting said valve body, after it has been sufficiently pre-heated to a uniform internal pressure at least equal to the normal operating pressure of the fluid to be used therein to effect a relatively rapid plastic flow and slight permanent deformation of portions of said valve body to effect a desired stress distribution in said valve body; partially cooling said valve body to a temperature at least as low as 700° F. while maintaining said internal pressure to prevent reverse plastic flow; relieving said internal pressure; and thereafter machining said valve body to its finished dimensions.

6. A method for increasing the dimensional stability of thick-walled valve bodies adapted to contain high pressure, high temperature fluids comprising the steps of heating said valve body uniformly to a treating temperature in excess of the expected operating temperature to increase the ductility of said valve body, applying to the interior of said body a uniform fluid pressure at least as high as the expected operating pressure, maintaining said pressure and temperature within said valve body from one to ten hours to cause rapid creep of the internal fibers of said body wall and thereby redistribute the stresses in said body wall, cooling said body to a temperature from 200° F. to 300° F. below said treating temperature while maintaining said internal pressure to prevent reverse plastic flow, and thereafter relieving said internal pressure.

7. A method for increasing the dimensional stability of thick-walled valve bodies adapted to contain high pressure, high temperature fluids comprising the steps of heating said body uniformly to a temperature in excess of the expected operating temperature to increase the ductility of said body wall, applying to the interior of said valve body a uniform fluid pressure at least as high as the expected operating pressure, maintaining said pressure and temperature a sufficient time to cause rapid creep of the internal fibers of said body wall and thereby redistribute the stresses in said body wall, at least partially cooling said valve body while maintaining said internal pressure to prevent reverse plastic flow, and thereafter relieving said internal pressure.

References Cited in the file of this patent

UNITED STATES PATENTS

| | | |
|---|---|---|
| 1,721,197 | Almen | July 16, 1929 |
| 1,851,553 | Walker | Mar. 29, 1932 |
| 2,118,317 | Mader | May 24, 1938 |
| 2,503,190 | Branson | Apr. 4, 1950 |